United States Patent

Melikian et al.

[15] 3,648,194
[45] Mar. 7, 1972

[54] SEMICLOSED CYCLE GAS LASER SYSTEM

[72] Inventors: Gorken Melikian, Springfield, Mass.; Frank R. Biancardi, Vernon, Conn.

[73] Assignee: United Aircraft Corporation, East Hartford, Conn.

[22] Filed: Sept. 10, 1969

[21] Appl. No.: 858,566

[52] U.S. Cl. ............................................. 331/94.5, 330/4.3
[51] Int. Cl. ....................... H01s 3/09, H01s 3/22, H01s 3/04
[58] Field of Search ................................. 331/94.5; 330/4.3

[56] References Cited

UNITED STATES PATENTS 3,391,281  7/1968  Eerkens ............................ 331/94.5 X
3,435,363  3/1969  Patel ................................... 331/94.5

Primary Examiner—Ronald L. Wibert
Assistant Examiner—R. J. Webster
Attorney—Melvin Pearson Williams

[57] ABSTRACT

A flowing gas laser system of the mixing type removes lasing gas from the laser effluent so as to recycle the remaining gas, such as a mixture of energizing gas and relaxant gas. Fresh lasing gas is introduced into the system from a pressurized source thereof. Typically, carbon dioxide is removed from the laser effluent so as to permit reuse of a mixture of helium and nitrogen, by means of a lithium oxide or lithium hydroxide solid absorbent bed which is cooled by expanded $CO_2$ from the liquefied source. In one embodiment, the liquid $CO_2$ also precools the main gas flow prior to entrance into the $CO_2$ adsorber. The warmed $CO_2$, with or without additional external heat supplied thereto, is passed through an expander, which operates a turbine to drive a compressor used for creating flow through the system. The $CO_2$ which leaves the expander at temperatures of about 0° F. is then divided into two streams. One stream may be used to precool the laser effluent gases prior to reaching the compressor inlet as well as cool the laser chamber, while the other stream is used directly in the laser chamber. An excess of $CO_2$ may be flowed through all of the above-described processes by venting some of it to ambient, and using only part of it as the lasing gas, or a part of the $CO_2$ may be passed directly from the liquefied source into the laser chamber. A second embodiment employs a prime mover to drive the flow-inducing compressor, the liquid $CO_2$ being expanded and passed directly into the laser chamber at a very low temperature or serving to remove heat from the $CO_2$ adsorber, prior to its use as a lasing gas. External coolants are provided so as to cool the adsorbent or pre- and post- cool the laser effluent as it moves through a compressor, thereby maintaining the size of the compressor and the power requirements thereof quite small. Electrical power may be generated on the compressor drive shaft in either embodiment. The latter embodiment may employ readily available electrical power to run an electric excitation power supply, and even a small electric motor to drive the compressor.

13 Claims, 4 Drawing Figures

INVENTORS
GORKEN MELIKIAN
FRANK R. BIANCARDI
BY Melvin Pearson Williams
ATTORNEY

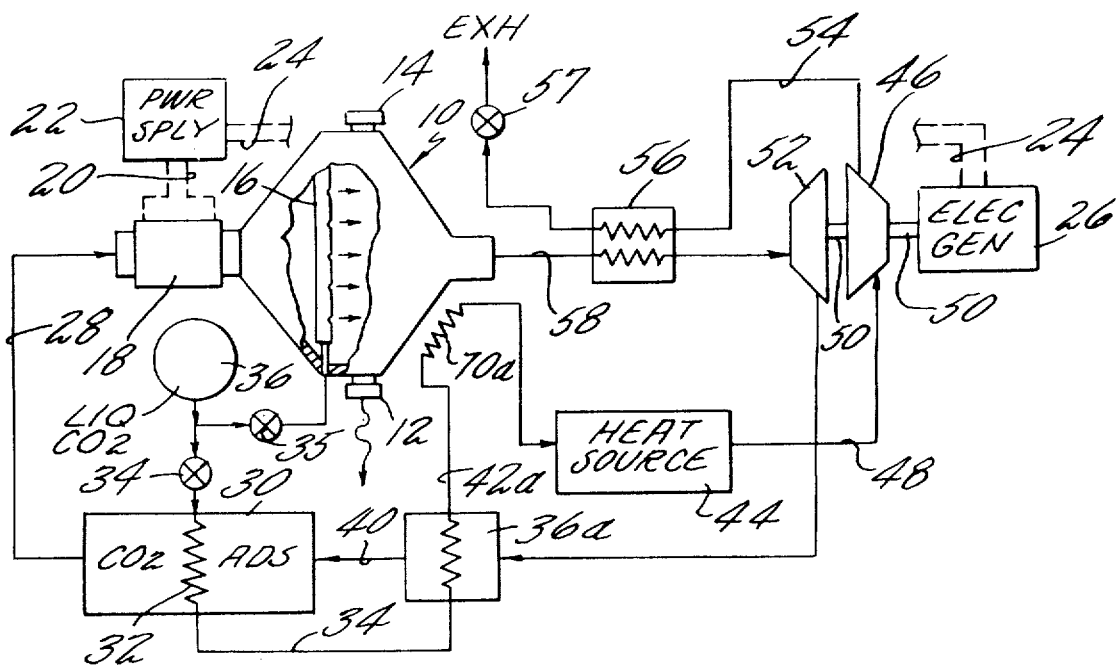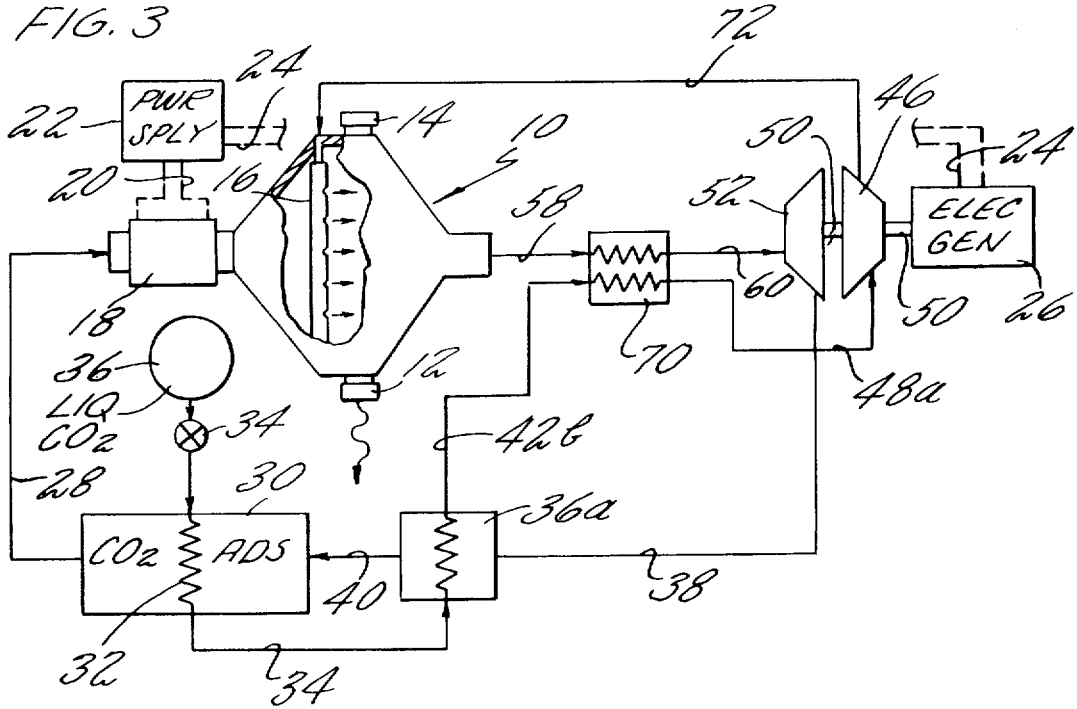

SEMICLOSED CYCLE GAS LASER SYSTEM

BACKGROUND OF THE INVENTION

1. Field of Invention

This invention relates to flowing gas lasers of the mixing type, and more particularly to a semiclosed cycle system therefor.

2. Description of the Prior Art

It is known in the art to product laser radiation in a flowing gas laser which introduces the laser gas in proximity with the laser cavity separately from the excited energizing gas. In such systems, it is necessary to supply separate sources of lasing gas and energizing gas to the laser chamber. The energizing gas may have mixed therewith a relaxant gas. A typical system of this type employs carbon dioxide as a lasing gas, nitrogen as an energizing gas, and helium as a relaxant. There are a wide variety of attractive applications for self-contained high-power laser units, such as mobile flowing gas laser apparatus. However, such apparatus must include stored fuel and consumables. It is thus attractive to minimize the amount of stored consumables and fuel required. Fuel is consumed by the prime mover to drive the compressor which provides flow through the system, and therefore conservation of fuel suggests that the inlet temperature of a compressor be kept as low as possible. It is also known that the performance of a gas laser would be enhanced with low-input gas temperatures. Additionally, it is impractical to provide lightweight, highly efficient prime movers of small size. Thus, there are a number of functional requirements for self-contained flowing gas lasers of the mixing type which mitigate against the operation of closed-cycle systems without provisions for cooling and refrigeration as well as circulation and separation of the laser gases.

SUMMARY OF INVENTION

The object of the invention is to provide an improved flowing gas laser system of the mixing type.

According to the present invention, lasing gas is removed from the effluent of a flowing gas laser of the mixing type, and the remaining gases are recycled through the laser; fresh lasing gas is introduced. According still further to the present invention, a high-pressure source of liquefied lasing gas is used to cool the $CO_2$ adsorption apparatus prior to the use of this gas or additional $CO_2$ gas as the lasing gas in the laser. In accordance with further aspects of the present invention, the lasing gas may be flowed through heat exchangers prior to introduction into the laser chamber so as to improve overall laser cycle operation. In further accord with the invention, excess lasing gas may be vented to ambient so as to permit a greater flow through the heat exchange element of the lasing gas adsorption apparatus and various heat exchangers than the flow required for operation of the laser itself. In accordance with the invention still further, the flowing lasing gas may be utilized to drive the flow-inducing compressor, thus obviating the need for a prime mover or a source of fuel. Further, heat may be added to the flow of lasing gas so as to increase its work-producing capacity where system demands so require. The broadest aspects of the invention may be incorporated in a system utilizing a prime mover, with a highly conservative use of stored low enthalpy lasing gas directly in the laser or to cool the lasing gas adsorption apparatus prior to passage into the laser system.

The present invention permits recycling of energizing and relaxant gases, while introducing fresh lasing gas from a source. This simplifies the separation process since the lasing gas need not be recovered, but simply removed from the main stream of laser effluent gas. Additionally, utilization of the low enthalpy (heat sink capacity) of pressurized, liquefied lasing gas eliminates the need for other heat sinks or for fuel, and permits operating a self-contained flowing gas laser system of the mixing type at low-input laser gas temperatures, a minimum of stored consumables and/or fuel, and with low-pressure losses.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIGS. 1 through 4 are simplified schematic diagrams of semiclosed cycle flowing gas laser systems of the mixing type in accordance with the present invention.

DESCRIPTION OF THE PREFERRED EMBODIMENT

Figure 1:
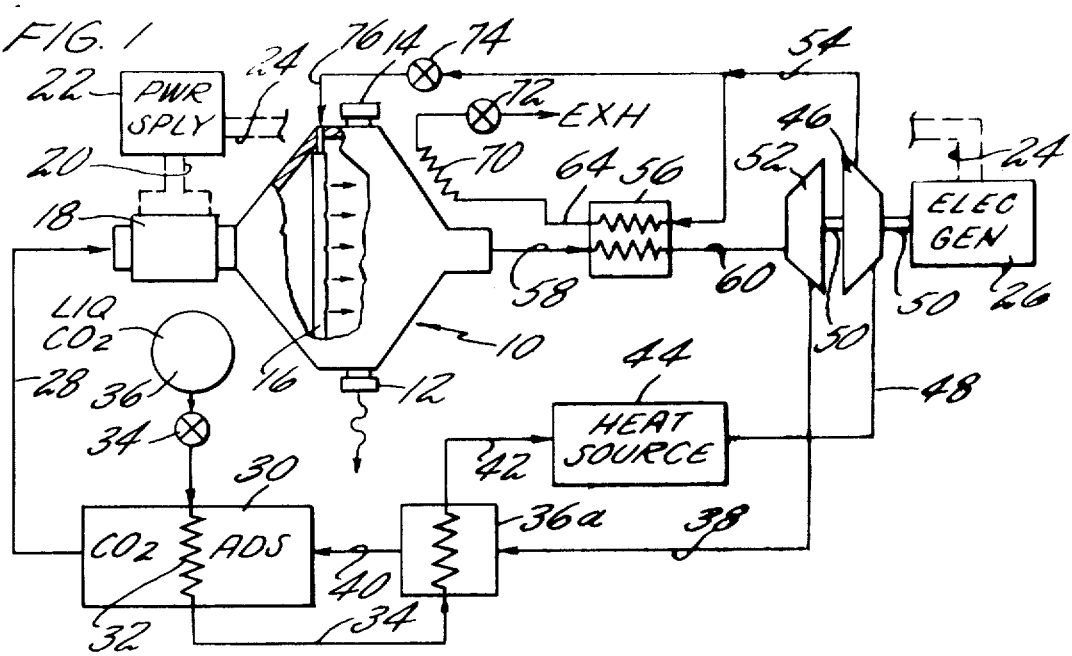

Referring now to FIG. 1, a gas laser 10 includes an optical cavity having mirrors 12, 14 into which is injected a lasing gas, such as carbon dioxide, by means of an injecting rod or spray bar 16. Also a mixture of energizing and relaxant gases (such as nitrogen and helium) are flowed through a high-voltage DC electric discharge plasma, or other excitation means 18, into the laser cavity. The excitation means 18 is connected by wires 20 to a power supply 22 which is supplied power by wires 24 from an electric generator 26. Useful optical power may be extracted through one of the mirrors, such as mirror 12.

The energizing and relaxant gases are supplied by a conduit 28 from a $CO_2$ adsorption apparatus 30 which may comprise a lithium oxide or lithium hydroxide bed arranged preferably in the form of a disposable cartridge. The adsorption of $CO_2$ into such a bed is exothermic, so heat may be removed from the reaction within the $CO_2$ adsorption apparatus 30 by a heat exchange element 32 which is supplied a cold mixture of liquid and gaseous $CO_2$ from an expansion valve 34 that is connected to a tank 36 of pressurized liquid $CO_2$. The expansion valve 34 expands the liquid $CO_2$ from the source 36 so as to provide it in a mixed liquid-gaseous flow at very low temperatures. The low temperatures will be maintained even though a great amount of heat is absorbed into the flow due to the heat required for vaporization of the flow. Since the temperature can remain extremely low (on the order of $-60°$ F.), the size of all the heat exchangers through which this flow may pass (described hereinafter) for a given rate of heat exchange, can be much smaller than they would be if the liquid $CO_2$ were not brought to a lower temperature by expansion. In other words, if the liquid $CO_2$ were released from the tank without expansion, it would maintain the same temperature that it had assumed while pressurized (say ambient, about $70°$ F.) so that even though it could absorb vast quantities of heat, it would do so only at $70°$ and would be vaporizing at $70°$. Thus it could remove heat only from fluids at a much higher temperature, or at a somewhat higher temperature with large heat exchangers.

In the embodiment of FIG. 1, the $CO_2$ becomes gaseous as it passes through the heat exchange element 32, due to the heat it absorbs as a result of the exothermic $CO_2$ adsorption reaction. It should be noted that $CO_2$ which has passed through the laser is adsorbed by the adsorption apparatus 32, and fresh $CO_2$ is utilized to cool this apparatus. All of the $CO_2$ which is eventually adsorbed in the apparatus 30 has previously passed through the heat exchanger 32. The gaseous $CO_2$ is passed by a conduit 34 to a heat exchanger 36a where it removes heat from the main flow of laser effluent in a duct 38, to thereby cool the effluent before it passes through a duct 40 to the $CO_2$ adsorption apparatus 30. From the heat exchanger 36a, a duct 42 carries the $CO_2$ to a heater 44. The heater 44 may supply no heat, a little heat, or a lot of heat to the $CO_2$ as is necessary, in dependence upon the power requirements of a turbine 46 to which the heater is connected by a duct 48. The turbine 46 drives a shaft 50 which may be utilized to drive the electric generator 26 and the compressor 52 which causes the necessary flow of gases through the system. Because the low-pressure energizing and relaxant gases are circulated in a closed loop there is no need to compress these gases to atmospheric pressures or higher. This being so, the compressor 52 can be much smaller and consume much less power than would be true if the laser effluent were vented to atmosphere. This is one of the primary advantages of the present invention.

The $CO_2$ expands to a pressure somewhat above atmospheric and cools (to perhaps 0° F.) as it passes through the turbine 46, and is then separated into two streams, one of which is then conducted by a conduit 54 to a heat exchanger 56. In the heat exchanger 56, the temperature of the $CO_2$ is raised by removing heat from the main laser effluent supplied thereto by a conduit 58, so that as it is conducted to the compressor inlet by a conduit 60, it is at a reasonably low temperature, thereby avoiding an unduly large compressor 52. From the heat exchanger 56, the conduit 64 carries the $CO_2$ to a heat exchange element 70 which is in the thermal communication with the main structure of the laser 10, and removes waste heat therefrom, thus lowering the total enthalpy and temperature of the effluent in the conduit 58. A valve 72 permits exhausting the heat exchanger 70 to ambient pressure.

The other portion of the $CO_2$ in the conduit 54 is passed through an expansion valve 74 to reduce its pressure from approximately atmospheric to approximately that of the laser chamber. The gas is then passed through a conduit 76 to the spray bar 16, where the $CO_2$ enters the laser cavity at a low temperature and produces laser radiation in a fashion known to the art.

Operating conditions of the embodiment of FIG. 1 must all relate to the required nominal operating conditions of the gas laser 10. The flow of energizing and relaxant gases through the energizing means 18 should be at about 100° F. or lower and at a pressure of roughly 50 to 75 Torr. Thus, the outflow of these gases from the $CO_2$ adsorption apparatus 30 should be at low pressure and at about 100° F. If the pressure is not otherwise suitable, an expansion valve may be inserted in the conduit 28. The temperature, however, is readily adjusted since the heat exchange element 32 may be so designed and proportioned to reach that temperature, the temperature of mixed liquid and gaseous $CO_2$ therethrough being sufficiently low. For instance, the source 36 of liquid $CO_2$ may be at about 60 atmospheres, and it may be reduced in the expansion valve 34 to about 5 atmospheres. Since the expanded, semigaseous $CO_2$ has a temperature in the neighborhood of −60° F., there is an extremely good heat exchange capability to remove not only residual heat in the flow within the conduit 40 as it enters the adsorption apparatus, but also all of the heat generated as a result of adsorbing the $CO_2$.

By properly sizing the heat exchanger 70, the laser cavity can be maintained at a temperature commensurate with an effluent temperature in the conduit 58 of about 400° F. This is cooled in the heat exchanger 56 to approximately 100° F., thus minimizing the power requirements and size of the compressor 52 and turbine 46. As the mixture of nitrogen, helium and $CO_2$ is compressed, it may be pumped up to between 120 and 150 Torr, at a temperature of between 240° F. and 340° F. The heat exchanger 36a can reduce this to 125° to 150° F. provided that the temperature of the gaseous $CO_2$ in the conduit 34 is around 100° to 125° F. As before described, extra heat in the gases within the conduit 40 as well as the heat of adsorption can be removed from the $CO_2$ adsorption apparatus 30 so that its outflow is at around 100° F.

The $CO_2$ leaving the heat exchanger 36a in the conduit 42 may be at roughly 200° F. However, a typical installation may require the $CO_2$ in the conduit 48 at a temperature of between 270° F. and 370° F. in order to get sufficient work out of the turbine 46 to drive the generator 26 and the compressor 52. In such a case, the heater 44 can consume some small amounts of fuel to raise the relatively low flow of gaseous $CO_2$ to this higher temperature. In cases where a relatively small system is utilized, or where it is desirous to eliminate the heater and any fuel therefore, an excess amount of $CO_2$ may be utilized, thus increasing the consumption of $CO_2$ and therefore the amount of $CO_2$ which must be storable in the system. The excess $CO_2$ can be accommodated by being passed through the heat exchanger 70 at the gas laser 10, and thence to ambient pressure. After expansion, the $CO_2$ in the conduit 54 may be at a temperature of between −20° F. and +40° F., so that a portion of this gas is capable of good heat exchange with the hot effluent (400° F.) of the laser in the conduit 58 within heat exchanger 56. As the $CO_2$ leaves the heat exchanger 56 in conduit 64, it may have a temperature something under 100° F., so that it is still capable of a good heat exchange relationship in the heat exchanger 70. The remaining $CO_2$ from the turbine exhaust may be introduced to the spray bar 16 for use in the gas laser 10.

A variation of the embodiment of FIG. 1, shown in FIG. 2 may utilize a portion of the $CO_2$ outflow of the storage container 36 to supply the spray bar 16 directly through a reducing valve 35, and the remainder of the $CO_2$ is passed through a valve 34 into the heat exchanger element 32, thereby cooling the adsorber 30. From the adsorber 30, the stream of $CO_2$ is then passed through a conduit 34 to a heat exchanger 36a, and then to a heat exchange element 70a. Further heating of this flow is conducted, as necessary, in the heat source 44, prior to passage of the flow through conduit 48 to the expander 46 and then through conduit 54 to the heat exchanger 56. This excess $CO_2$ is finally exhausted to ambient pressure through a valve 57.

This embodiment consumes a slightly increased amount of $CO_2$, but has a lower fuel consumption, the $CO_2$ being supplied at an increased temperature to the heat source 44, and provides a lower temperature $CO_2$ feed directly to the spray bar 16. Thus, the overall performance of the laser system is improved.

A further modification of the invention is illustrated in FIG. 3. Therein, as the gaseous $CO_2$ leaves the heat exchanger 36a in a duct 42b, it is supplied directly to a heat exchanger 70 before being passed over a duct 48a to the turbine expander 46. The heat exchanger 70 also receives effluent of the laser in the duct 58 and passes it over the duct 60 to the compressor 52. Thus, the heat required in the $CO_2$ in order to impart sufficient energy to drive the turbine expander 46 (with the electric generator 26 and compressor 52 as loads) is all supplied by the heat-sinking capability of the pressurized liquid $CO_2$ (36) and the heat imparted to the $CO_2$ by the heat exchangers 30, 36a and 70. In this embodiment, the spray bar 16 is directly connected through a conduit 72 to the turbine-expander 46, and there is no heat exchanger on the jacket of the gas laser 10.

The embodiments of FIGS. 1 and 3 are particularly well suited to systems wherein a high concentration of $CO_2$ is desired in the laser gas flow, and a high flow rate per unit of optical power or to systems requiring less work be performed by the compressor 52. In FIG. 3, $CO_2$ is conserved since excess thereof is not required as a coolant for the gas laser jacket. Also, although shown in FIG. 3 with no heat source, it should be understood that a heat source such as the source 44 could readily be inserted within the conduit 48a if necessary in order to supply sufficient energy to the turbine-expander 46 in order to satisfy the load requirements of the system.

Figure 4:
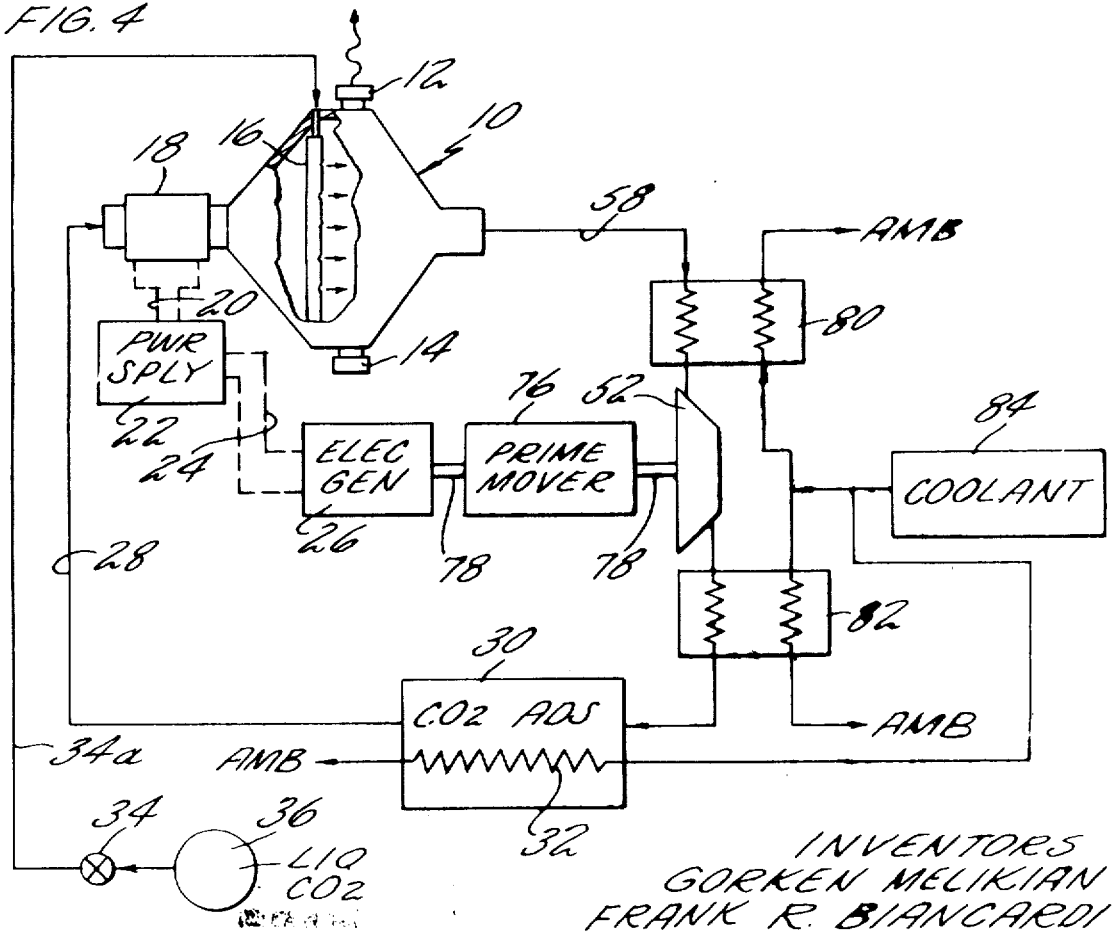

A second embodiment of the invention is illustrated in FIG. 4. The main distinction between this and the embodiments of FIGS. 1 through 3 is that a prime mover 76 drives a shaft 78 for operating the electrical generator 26 and the compressor 52. In this embodiment, the $CO_2$ is fed through pressure-reducing valves directly into the laser 10 or utilized to cool the adsorption apparatus 30 and to operate the gas laser 10. The $CO_2$ pressure may be maintained above 5.112 atmospheres in the conduit 34a to prevent the formation of solid $CO_2$ prior to expansion of the $CO_2$ through the spray bar 16. In order to keep the size of the prime mover 76 as small as possible, a heat exchanger 80 may be utilized to cool the effluent of the laser 10 within the conduit 58, so that the inlet temperature of the compressor 52 will not be too high. Additionally, a heat exchanger 82 may cool the main flow of gas as it leaves the compressor 52 so as to remove the heat of compression therefrom prior to passing the gas through the $CO_2$ adsorption apparatus 30. The adsorber 30 is cooled by an externally supplied coolant passing through heat exchanger 32. Further, an additional option may employ the $CO_2$ 36 to maintain the adsorber 30 at a moderate temperature prior to being introduced into the spray bar 16. This is desirable since common adsorption material such as lithium oxide and lithium hydroxide do not function well if the inlet gas is allowed to go much over 125° to 150° F. However, the heat exchange element 32 tends to keep the apparatus 30 cool since the coolant enters the heat exchange element 32 at roughly 60° to 100° F.

The heat exchangers 32, 80, 82 may be supplied water or other coolant from a source 84 which may be any suitable source (such as tap water or a nearby stream) or may in fact comprise a portion of an air-cooled, pumped coolant system, as is known in the art. This embodiment utilizes a minimum of $CO_2$, since flow is provided by the prime mover.

The prime mover 76 in the embodiment of FIG. 4 may comprise a small gasoline engine, since the work required to operate the compressor 52 is minimal, there being only small pressure drops across the adsorption material 30 and through the heat exchangers 80, 82. On the other hand, the embodiment of FIG. 4 may be modified if a suitable source of electrical power is available. The source of electrical power may take the place of the electric generator 26 and in fact provide power to an electric motor which could be substituted for the prime mover 76 as well as power for the power supply 22. Thus, a self-contained system, relying only on a source of electrical power can be also achieved with the embodiment of FIG. 4. A further alternative to the embodiment shown in FIG. 4 could provide an expander attached to shaft 78 which would develop power to help drive the compressor 52 and generator 26. Such an expander could be driven by the $CO_2$ from source 36 preheated by passage through the adsorber 30 and heat exchangers 80 and 82. This variation of the FIG. 4 embodiment would reduce the required prime mover power, fuel, and coolant flow, of the system, at the expense of additional components and complexity.

Thus, the present invention provides the singular advantage, to a flowing gas laser of the mixing type, of permitting self-contained operation utilizing only a source of pressurized liquid lasing gas, or such source together with small amounts of fuel or electric power. The energizing and relaxant gases are cycled, since carbon dioxide is removed therefrom in a very simple fashion. The pressure drops through the system are much lower than a system in which separation of lasing gas results in recovery thereof for further use, thus mitigating the amount of energy which has to be imparted into the system in order to maintain laser operation. Further, the invention incorporates use of the cold $CO_2$ directly as the lasing gas or to cool the $CO_2$ separator, and in certain embodiments to cool laser gas effluent at various points in the cycle. The present invention is capable of being implemented in a variety of fashions, and although it has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A semiclosed cycle, flowing gas laser system for producing an output of laser energy, said system utilizing an electric discharge excited mixing laser and chargeable with an initial charge of a mixture gas which includes an energizing gas and a relaxant gas, said system comprising:
 a source of laser gas which is stored under pressure in a liquid state;
 means connected to the laser gas source for expanding the liquid to form at least some laser gas;
 means for electrically exciting said mixture gas;
 a laser chamber comprising;
  a. an inlet means for admitting said excited mixture gas into said chamber;
  b. means for admitting laser gas into said chamber and for admixing the laser gas with the excited mixture gas in the chamber to form a gas admixture and at least a population inversion in said laser gas; and
  c. outlet means for permitting the exhaustion of the admixture from the laser chamber;
 laser gas removal means, positioned between the laser chamber outlet and the excitation means for removing the laser gas contained in the exhausted admixture and discarding the removed laser gas from the system, said removal means having heat exchange means for receiving cool laser gas from said laser expanding means and for transferring heat from said removal means to said cool laser gas;
 means for conducting the cool laser gas through said removal heat exchange means to said laser chamber admixing means;
 means including a compressor means for;
  a. exhausting said admixture from said chamber outlet means and moving said admixture to said removal means; and
  b. moving said mixture gas from said removal means through said excitation means and into said chamber inlet means; and
 optical means positioned about said laser chamber for at least coupling laser radiation from said chamber.

2. The system according to claim 1 including a first heat exchanger in the admixture flow between the compressor means and the laser gas removal means wherein the means for conducting the laser gas from the expanding means to the admixing means include means for conducting laser gas from the source through said first heat exchanger and then to the admixing means.

3. The system according to claim 2 including a second heat exchanger in the admixture flow between the outlet means and the compressor means wherein the means for conducting the laser gas from the first heat exchanger to the admixing means includes means for conducting the laser gas from the first heat exchanger through the second heat exchanger and then to the admixing means.

4. The system according to claim 2 including a turbine expander connected to the flow of laser gas between the first heat exchanger and the admixing means, the turbine expander being rotated by a pressure expansion of the laser gas.

5. The system according to claim 4 including means for applying heat to the laser gas at the input to said turbine expander.

6. The system according to claim 3 including a turbine expander connected to the flow of laser gas between the first heat exchanger and the admixing means of said gas laser, said turbine expander being rotated by a pressure expansion of the laser gas.

7. The system according to claim 6 including means for applying heat to the laser gas at the input to said turbine expander.

8. The system according to claim 1 including a turbine expander connected to the flow of laser gas between the laser gas removal heat exchange means and the laser chamber admixing means.

9. The system according to claim 8 including means for applying heat to the laser gas at the input to said turbine expander.

10. The system according to claim 3 including a turbine expander connected to the flow of laser gas between the laser gas removal means and the admixing means, the turbine expander being rotated by a pressure expansion of the laser gas, said turbine expander driving said compressor.

11. The system according to claim 10 including means for applying heat to the laser gas at the input to said turbine expander.

12. The system according to claim 1 wherein the compressor is coupled to a turbine driven by a gas flow from the source of laser gas.

13. The system according to claim 1 wherein the compressor includes a prime mover which is supplied energy from a source outside of the laser system.

* * * * *